(12) United States Patent
Penicaud et al.

(10) Patent No.: US 9,120,675 B2
(45) Date of Patent: Sep. 1, 2015

(54) GRAPHENE SOLUTIONS

(75) Inventors: Alain Penicaud, Bordeaux (FR); Cristina Valles, Bordeaux (FR)

(73) Assignee: Centre National De La Recherche Scientifique-CNRS, Paris (FR)

(*) Notice: Subject to any disclaimer, the term of this patent is extended or adjusted under 35 U.S.C. 154(b) by 1477 days.

(21) Appl. No.: 12/672,773

(22) PCT Filed: Aug. 8, 2008

(86) PCT No.: PCT/FR2008/001178
§ 371 (c)(1), (2), (4) Date: Feb. 16, 2011

(87) PCT Pub. No.: WO2009/056696
PCT Pub. Date: May 7, 2009

(65) Prior Publication Data
US 2011/0130494 A1 Jun. 2, 2011

(30) Foreign Application Priority Data
Aug. 9, 2007 (FR) .................................... 07 05803

(51) Int. Cl.
| C08K 5/3415 | (2006.01) |
| C01B 31/04 | (2006.01) |
| C09K 3/00 | (2006.01) |
| C09D 1/00 | (2006.01) |
| B05D 1/18 | (2006.01) |
| B05D 1/02 | (2006.01) |
| B82Y 30/00 | (2011.01) |
| B82Y 40/00 | (2011.01) |

(52) U.S. Cl.
CPC ............. *C01B 31/0415* (2013.01); *B82Y 30/00* (2013.01); *B82Y 40/00* (2013.01); *C01B 31/0469* (2013.01); *C01B 31/0484* (2013.01); *C01B 2204/02* (2013.01); *C01B 2204/04* (2013.01)

(58) Field of Classification Search
USPC .................. 524/495, 104; 252/182.13, 182.23
See application file for complete search history.

(56) References Cited

FOREIGN PATENT DOCUMENTS

| EP | 0 905 809 A1 | 3/1999 |
| FR | 2 652 355 A1 | 3/1991 |
| JP | 2004-224579 A | 8/2004 |
| WO | WO 2005/073127 A | 8/2005 |

OTHER PUBLICATIONS

Beguin et al. (The Reversible interaction of Tetrahydrofuran in some Graphite-Alkali Metal Lamellar Compounds, Material Science Engineering, Materials Science Engineering, Elsevier Sequoia, Lausanne, CH, vol. 40, Jan. 1, 1979 7 pages 167-173, XP002481409 ISSN: 0025-5416.*
Beguin et al, "The Reversible Intercalation of Tetrahydrofuran in some Graphite-Alkali Metal Lamellar Compounds", *Materials Science Engineering, Elsevier Sequoia*, Lausanne, CH, vol. 40, Jan. 1, 1979, pp. 167-173.
Stankovich et al, "Graphene-Based Composite Materials", *Nature, Nature Publishing Group*, London, UK, vol. 442, Jul. 20, 2006, pp. 282-286.
Viculis et al, "A Chemical Route to Carbon Nanoscrolls", *Science, US American Association for the Advancement of Science*, Washington, D.C., vol. 229, Feb. 28, 2003, p. 1361.
Inagaki et al, "Production of Exfoliated Graphite from Potassium-Graphite-Tetrahydro Furan Ternary Compounds and its Applications", *Synthetic Metals, Elsevier Sequoia*, Lausanne, CH, vol. 8, Jan. 1, 1983, pp. 335-342.
Kotov, "Carbon Steel Solutions", *Nature, Nature Publishing Group*, London, UK, vol. 442, Jul. 20, 2006, pp. 254-255.
Falcoa et al, "Microwave Exfoliation of a Graphite Intercalation Compound", *Carbon, Elsevier*, Oxford, GB, vol. 45, No. 6, Apr. 27, 2007, pp. 1367-1369.
Worsley et al, "Soluble Graphene Derived from Graphite Fluoride", *Chemical Physics Letters*, North-Holland, Amsterdam, vol. 445, Jul. 24, 2007, pp. 51-56.
Niyogi et al, "Solution Properties of Graphite and Graphene", *Journal of the American Chemical Society, American Chemical Society*, Washington, D.C., vol. 128, Jan. 1, 2006, pp. 7720-7721.
Chakraborty et al, "Functionalization of Potassium Graphite", *Angewandte Chemie. International Edition*, Wiley VCH Verlag, Weinheim, vol. 46, Mar. 3, 2007, pp. 4486-4488.
Guerard et al, "Synthesis Crystallographic Study and Electrical Conductivity of GICs with Alkali Metal Hydrides", *Synthetic Metals, Elsevier Sequoia*, Lausanne, CH, vol. 34, Jan. 1, 1989, pp. 27-32.
Bourlinos et al., "Graphite Oxide: Chemical Reduction to Graphite and Surface Modification with Primary Aliphatic Amines and Amino Acids," Langmuir, 2003, vol. 19, No. 15, pp. 6050-6055.
Japanese Office Action, Japanese Patent Application No. 2014-217496 issued May 19, 2015.

* cited by examiner

*Primary Examiner* — Ling Choi
*Assistant Examiner* — Chun-Cheng Wang
(74) *Attorney, Agent, or Firm* — Arent Fox LLP

(57) ABSTRACT

The present invention relates to a method of solubilizing graphite and applications thereof, including the manufacture of composites and the purification of graphene.
The method of the invention is characterized in that it comprises the following steps carried out under inert atmosphere:
a) reduction of graphite by an alkali metal to lead to a graphite intercalation compound; and
b) exposure of the graphite intercalation compound to a polar aprotic solvent to lead to a reduced graphene solution.
The present invention relates more particularly to graphene solutions and graphene planes obtained through said method, as well as uses of such graphene solutions and planes.

29 Claims, 6 Drawing Sheets

STM (scanning tunnelling mircroscopy)

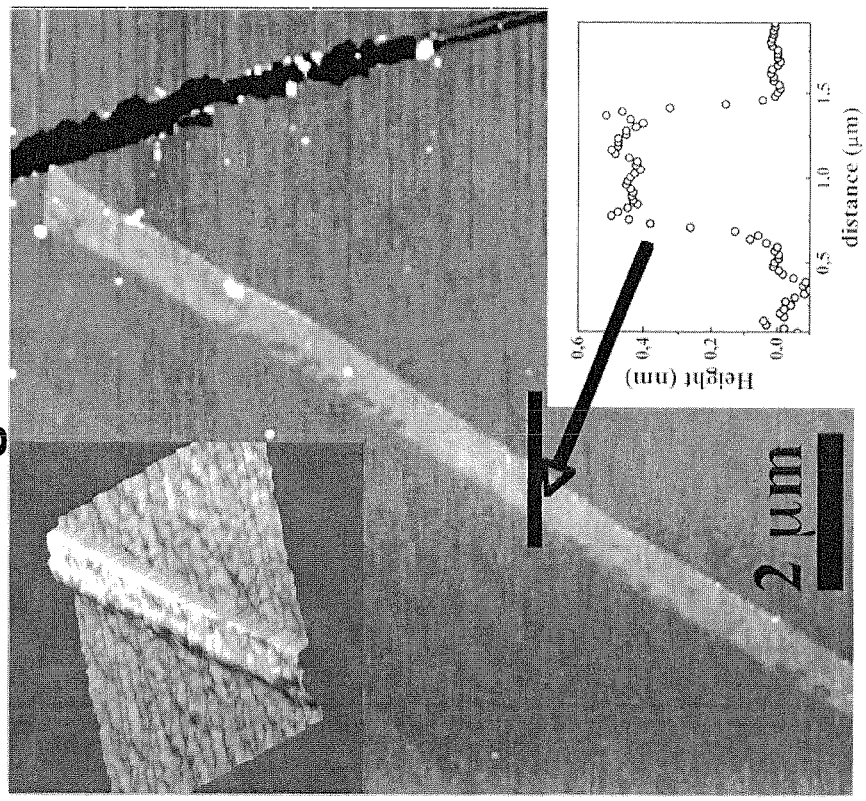

GRAPHENE SOLUTIONS

CROSS-REFERENCE TO RELATED APPLICATION

This application is a National Stage entry of International Application No. PCT/FR2008/001178, filed Aug. 8, 2008, which claims Priority to French Patent Application No. 0705803, filed Aug. 9, 2007. The disclosure of the prior application is hereby incorporated in its entirety by reference.

TECHNICAL FIELD

The present invention relates to a method for solubilizing intercalated graphite and applications thereof, including the manufacture of composites and the purification of graphene.

The present invention more particularly relates to graphene solutions and graphene planes obtained through said method, as well as uses of such graphene solutions and planes.

Being able to obtain graphene in the form of solutions is of a great interest from an industrial application point of view, more particularly with respect to processing these solutions for a given application. Specifically, such solutions can readily be used to deposit graphene planes on a given substrate, to form graphene films or to manufacture, graphene-containing composites by impregnation. Such solutions also open up the way to graphene purification.

In the description that follows, the references between square brackets ([ ]) refer to the list of references given after the examples.

STATE OF THE ART

Carbon is known as having four unique crystalline structures or structure families: diamond, graphite, fullerenes and carbon nanotubes.

The tubular structure of carbon nanotubes confers unique mechanical, electric or chemical properties to them. For that reason, carbon nanotubes are commonly used in composite materials (Shaffer, M. S. P., Windle, A. H., "Fabrication and Characterization of Carbon Nanotube/poly(vinyl alcohol) Composites", Adv. Mater., 11, pp 937-941 (1999) [ref 1]), hydrogen fuel cells (Ye, Y., Ahn, C. C., Witham, C., Fultz, B., Liu, J., Rinzler, A. G., Colbert, D., Smith, K. A., Smalley, R. E., "Hydrogen Absorption And Cohesive Energy Of Single-Walled Carbon Nanotubes", App. Phys. Lett., 74, pp 307-2309 (1999) [ref 2]; Liu, C., Fan, Y. Y., Liu, M., Cong, H. T., Cheng, H. M., Dresselhaus. M. S., "Hydrogen Storage In Single-Walled Carbon Nanotubes At Room Temperature", Science, 286, pp 1127-1129 (1999) [ref 3]; Kong, J., Chapline, M, G., Dai, H., "Functionalized Carbon Nanotubes For Molecular Hydrogen Sensors", Adv. Mater. 13, 1384-1386 (2001) [ref 4], supercapacitors (Aldissi, M.; Schmitz, B.; Lazaro, E.; Bhamidipati, M.; Dixon, B., "Conducting Polymers in Ultracapacitor Applications", 56th Annu. Tech. Conf.—Soc. Plast. Eng., (Vol. 2), pp 1197-1201 (1998) [ref 5]; An, K. H.; Kim, W. S.; Park, Y. S.; Moon, J.-M.; Bac, D. J.; Lim, S. C.; Lee, Y. S.; Lee, Y. H. "Electrochemical Properties of High-Power Supercapacitors Using Single-Walled Carbon Nanotube Electrodes", Adv. Funct. Mater. 11, pp 387-392 (2001) [ref 6], catalysis (Yu, R., Chen, L., Liu, Q., Lin, J., Tan, K.-L., Ng, S. C., Chan, H. S. O., Xu, G.-Q., Hor, T. S. A. "Platinum Deposition On Carbon Nanotubes Via Chemical Modification", Chem, Mater, 10, pp 718-722 (1998) [ref 7]; (Planeix, J. M.; Coustel, N.; Cog, B.; Brotons, V.; Kumbhar, P. S.; Dutartre, R.; Geneste, P.; Bernier, P.; Ajayan, P. M., "Application Of Carbon Nanotubes As Supports_in Heterogeneous Catalysis", J. Am, Chem, Soc. 116, pp 7935-7936 (1994) [ref 8]) and nanometric-size electronic components or systems (Tans, S. J., Verschueren, A. R. M., Dekker, C., "Room-Temperature Transitor Based On A Single Carbon Nanotube", Nature 393, pp 49-52 (1998) [ref 9]; Bachtold, A.; Hadley, P.; Nakanishi, T.; Dekker, C., "Logic Circuits With Carbon Nanotube Transistors". Science 294 pp, 1317-1320 (2001) [ref 10]).

However, the relatively high cost of carbon nanotubes has significantly hampered their use on an industrial scale. Specifically, at present, the preparation of carbon nanotubes is carried out according to three methods: high temperature electric arc, laser ablation and catalytic decomposition methods. The electric arc method uses two graphite electrodes between which an electric arc is created, the anode gets consumed to form a plasma, the temperature of which can reach 6000° C. (Ijima, S. "Helical Microtubules of Graphitic Carbon." Nature, 354, 56-58 (1991) [ref 11]); Ebbeson, T. W., Ajayan, P. M. "Large Scale Synthesis Of Carbon Nanotubes", Nature 358, pp 220-222 (1992) [ref 12]. The laser ablation method consists in exposing a graphite target to a high energy pulsed or continuous laser radiation. The graphite is either vaporised or expulsed in small fragments of a few atoms (Saito et al., Chem. Phys, Lett., 1995, 236:419-426 [ref 13]); Thess, A.; Lee, R.; Nikolaev, P.; Dai, H.; Petit, P.; Robert, J.; Xu, C.; Lee, Y. H.; Kim, S. G.; Rinzler, A. G.; Colbert, D. T.; Scuseria, G. E.; Tomanek, D.; Fischer, J. E.; _Smalley, R. E., "Crystalline Ropes of Metallic Carbon Nanotubes" Science 273, pp 483-487 (1996) [ref 14]. The preparation of carbon nanotubes by decomposition of hydrocarbons or oxygenated compounds in the presence of supported transition metals has been reported in the literature. The most studied method is the catalytic decomposition of methane mainly on iron oxide (Muradov et al., Int. J. Hydrogen Energy, 1993, 18:211-215 [ref 15]), but also on $Ni/SiO_2$ (Ishihara et al., Chem. Lett., 1995, 2:93-94 [ref 16]). As a result, the price of carbon nanotubes is very high (of the order of 90 dollars per gram or more) (Oger, G., "French Firm Hopes To Get PR Bounce Out Of Nanotubes In Tennis Rackets", Small Times, Nov. 7, 2001, http://www.smalltimes.com/articles/article display.cfm?AR-TIC LE_ID=267637&p=109) [ref 17]), which limits the use of carbon nanotubes to small size applications, such as needles for tunnelling microscopy.

Thus, the scientific community developed an interest for an alternative carbon nanomaterial that has comparable properties but that is more easily accessible and at at lower costs: graphene.

Graphene, or graphite's basic plane, which has long been considered as a virtual object, recently became a reality thanks to the work of Novoselov et al. (K. S. Novoselov, A. K. Geim, S. V. Morozov, D. Jiang, Y. Zhang, S. V. Dubonos, I. V. Grigorieva, and A. A. Firsov, "Electric field effect in atomically thin carbon films", Science, 306, 666-669 (2004) [ref 18]; K. S. Novoselov, A. K. Geim, S. V. Morozov, D. Jiang, M. I, Katsnelson, I. V. Grigorieva, S. V. Dubonos, A. A. Firsov, "Two-dimensional gas of massless Dirac fermions in graphene", Nature, 438, 197-200 (2005) [ref 19] which describe electronic properties of this singular object.

Graphite is known for leading to intercalation compounds (graphite intercalation compounds or GIC) with either electron donors or acceptors. ("Synthesis of graphite intercalation compounds", A. Herold in Chemical physics of intercalation, A. P. Legrand and S. Flandrois Eds, NATO ASI Series, series B, Vol. 172, pp. 3-45 (1987) [ref 20]). Ternary compounds having the formula $M(THF)C_{24}$ have been obtained as early as 1965 by reduction of graphite with a polyaromatic molecule alkali salt in THF. (C, Stein, J. Poulenard, L. Bonnetain, J. Gole, C. R. Acad. Sci. Paris 260, 4503 (1965) [ref 21]).

Since 2004 and the publication of Novesolov et al., the world of physics has taken a keen interest in the electronic properties of graphene or graphite isolated plane (Electric field effect in atomically thin carbon films, Novoselov et al. Science 306, 666 (2004) [ref 22]). Novoselov et al.'s shear exfoliation method only allows obtaining a few isolated planes. In addition, such planes are stabilised on a surface, which prevents them from being subsequently handled, for example for integrating them into a matrix.

However, at present, no graphite solubilizing method exists, and graphene solutions as such have thus far remained elusive.

A few attempts to solubilize graphite have been reported, mainly by graphite functionalization (Chakraborty et al., "Functionalization of potassium graphite", Angew. Chem, Int. Ed., 46, 4486-4488 (2007) [ref 23] or by functionalization of graphite oxide. (Niyogi, S.; Bekyarova, E.; Itkis, M. E.; McWilliams, J. L.; Hamon, M. A.; Haddon, R. C., "Solution Properties of Graphite and Graphene", J. Am, Chem, Soc., 128, 7720-7721 (2006) [ref 24]; Mc Allister, M. J.; Li, J.-L.; Adamson, D. H.; Schniepp, H. C.; Abdala, A. A.; Liu, J.; Herrera-Alonso, M.; Millius, D. L.; Car, R.; Prud'homme, R. K.; Aksay, I. A., "Single Sheet Functionalized Graphene by Oxidation and Thermal Expansion of Graphite", Chem. Mater., 2007; ASAP Article [ref 25]).

However, one drawback of such methods is that the resulting graphite planes are functionalised and denatured.

Thus, there exists a real need for methods for solubilizing graphite that remedy these problems, drawbacks and obstacles known in the art, more particularly a method allowing to obtain graphene solutions that can readily be used for processing graphene for a given application, reducing the composite material manufacturing costs and improving accessibility to graphene in large quantity with high purity.

DESCRIPTION OF THE INVENTION

The present invention specifically aims at meeting such need by providing a method for solubilizing graphite, characterized in that it includes the following steps carried out under inert atmosphere:

a) Reduction of graphite by an alkali metal to lead to a graphite intercalation compound; and b) Exposure of said graphite intercalation compound to a polar aprotic solvent to lead to a solution of reduced graphene.

According to the invention, the alkali metal can be any alkali metal allowing the implementation of the present invention. It can be chosen for example in the group comprising lithium, sodium, potassium, rubidium and cesium. More particularly, the alkali metal can be lithium, sodium or potassium. Preferably, the alkali metal is potassium.

"Reduction by an alkali metal" as used herein refers to a reduction in which an alkali metal is involved. Thus, the reduction can be carried out directly in the presence of an alkali metal, for example in vapour phase. Reduction methods in the presence of an alkali metal are well known in the art. The persons skilled in the art will know how to identify the appropriate experimental conditions for implementing a reduction method in the presence of an alkali metal, for example in vapour phase. For instance, the person skilled in the art can draw from the method described in "Synthesis of graphite intercalation compounds", A. Herold in Chemical physics of intercalation, A. P. Legrand and S. Flandrois Eds, NATO ASI Series, series B, Vol. 172, pp. 3-45 (1987) for example [ref 20].

In another embodiment, the reduction is carried out in the presence of an alkali metal salt obtained from an alkali metal. For example, the reduction can be carried out in the presence of a polyaryl alkali salt having the formula $A^+B^-$, wherein $A^+$ represents a cation of an alkali ion and $B^-$ represents an anion of a polyaromatic compound. Such polyaryl alkali salts and methods for preparing them are described for example in (C. Stein, J. Poulenard, L. Bonnetain, J. Golé, C. R. Acad. Sci. Paris 260, 4503 (1965) [ref 21]; "Synthesis of graphite intercalation compounds", A. Herold in Chemical physics of intercalation, A. P. Legrand and S. Flandrois, Eds, NATO ASI Series, series B, Vol. 172, pp. 3-45 (1987) [ref 20]; F. Béguin and R. Setton New ternary lamellar compounds of graphite, Carbon 13, 293-)295 (1975) [ref 41].

According to one embodiment, the polyaromatic compound is selected from the group comprising naphthalene, benzophenone, fluorenone, benzoquinone and anthraquinone. In certain embodiments, the polyaromatic compound is naphthalene. In certain embodiments, the polyaryl alkali salt is a polyaryl potassium salt (i.e., a salt of the formula $A^+B^-$, wherein A+ represents K−). Advantageously, the polyaryl alkali salt of the formula $A^+B^-$ is a naphthalene potassium salt ($Naph^-K^+$).

In another embodiment, the reduction is carried out by electrochemistry, where graphite is used as a cathode and the alkali metal is in the form of an alkali salt. The electrochemical reduction of graphite takes place with the insertion of the alkali ions present in the solution.

"Graphite intercalation compound" or "GIC" as used herein refers to a compound comprising at least two individual negatively or positively charged graphene planes and intercalated by positive or negative counter ions. Graphite alkali salts are a particular example of GIC where the graphene planes are negatively charged and the counter-ions are alkali ions. The GIC can be in the form of a binary compound having the formula $MC_x$ where M represents a positive counter-ion of an alkali metal ($M^+$), and x represents an integer between 6 and 200. More particularly, the alkali metal can be potassium. For example, the GIC can be a binary compound having the formula $KC_8$.

In another embodiment, the GIC can be in the form of a ternary compound having the formula $M(Solv)_y C_x$ where M is an alkali metal ion ($M^+$), Solv is an aprotic solvent molecule, x represents an integer between 6 and 200 and y represents an integer between 0 and 4. The solvent molecule can be an aromatic solvent molecule (for example benzene or toluene) or a nucleophilic solvent molecule (for example, a solvent whose structure contains at least one oxygen atom, such as THF). For example, GIC can be a ternary compound with the formula $K(THF)C_{24}$ or $K(THF)_2C_{24}$.

"Reduced grapheme" as used herein refers to one or more individual negatively charged graphene plane(s). The negative charge is delocalized onto the carbon atoms forming the graphene plane.

In certain exemplary embodiments, the reduction step a) is carried out in the presence of a solvent. For example, the solvent can be a nucleophilic solvent. For example, the nucleophilic solvent can be an aprotic solvent whose structure contains at least one oxygen atom, for instance THF.

In certain embodiments, the graphite intercalation compound is in the form of a binary compound of formula $MC_x$ where M represents a positive counter-ion of an alkali metal ($M^+$), and x represents an integer between 6 and 200. More particularly, the alkali metal can be potassium. For example, the graphite intercalation compound can be a binary compound of formula $KC_8$.

In certain embodiments, the graphite intercalation compound is in the form of a ternary compound having the structure $M(Solv)_yC_x$ in which M is an alkali metal ion, Solv is a nucleophilic solvent whose structure contains at least one oxygen atom, x represents an integer between 6 and 200 and y represents an integer between 0 and 4. For example, the alkali metal may be potassium, the solvent may be THF and the graphite intercalation compound may be a ternary compound having the structure $K(THF)_yC_x$ where x represents an integer between 6 and 200, and y represents an integer between 0 and 4. In certain embodiments, the graphite intercalation compound is a ternary compound having the structure $K(THF)C_{24}$ or $K(THF)_2C_{24}$.

In certain embodiments, the reduction step is selected from the group comprising reduction by an alkali metal in vapour phase followed by exposure to an aprotic solvent, electrochemical reduction and reduction by a polyaryl alkali salt in an aprotic solvent. For example, the solvent can be an aromatic solvent such as benzene or toluene. The solvent can be an aprotic solvent whose structure contains at least one oxygen atom, such as THF.

In certain embodiments, the reduction step a) comprises the addition of a polyaryl alkali salt having the formula $A^+B^-$ to graphite under inert atmosphere, wherein:

$A^+$ represents a cation of an alkali ion, and $B^-$ represents an anion of a polyaromatic compound.

According to one embodiment, the polyaromatic compound is selected from the group comprising naphthalene, benzophenone, fluorenone, benzoquinone and anthraquinone.

In certain embodiments, the polar aprotic solvent used in the mixing step b) has a dielectric constant between 25 and 200.

The polar aprotic solvent used in the mixing step b) may have the following structure (I):

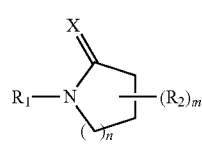

where n and m are independently 1 or 2;

X represents O or S:

$R_1$ represents H, a linear or branched $C_1$-$C_6$ alkyl or $C_2$-$C_6$ alkenyl group or a $C_3$-$C_6$ cycloalkyl or $C_5$-$C_6$ cycloalkenyl group; and $R_2$ represents H, a halogen atom, a linear or branched $C_1$-$C_6$ alkyl or $C_2$-$C_6$ alkenyl group, a $C_3$-$C_6$ cycloalkyl or $C_5$-$C_6$ cycloalkenyl group, or an —OR group, where R represents a linear or branched $C_1$-$C_6$ alkyl or $C_2$-$C_6$ alkenyl group, a $C_3$-$C_6$ cycloalkyl or $C_5$-$C_6$ cycloalkenyl group.

Advantageously, in the polar aprotic solvent of formula (I), $R_1$ may represent a linear or branched $C_1$-$C_6$ alkyl or $C_2$-$C_6$ alkenyl group, or a $C_3$-$C_6$ cycloalkyl group or a $C_5$-$C_6$ cycloalkenyl group.

The polar aprotic solvent used in the step mixing b) may have the following structure ($I^A$):

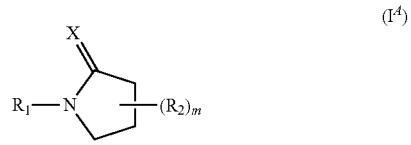

wherein X, m, $R_1$ and $R_2$ are as defined above.

Advantageously, in the polar aprotic solvent having the formula ($I^A$), $R_1$ may represent a linear or branched $C_1$-$C_6$ alkyl or $C_2$-$C_6$ alkenyl group, or a $C_3$-$C_6$ cycloalkyl or a $C_5$-$C_6$ cycloalkenyl group.

Advantageously, in the polar aprotic solvent having the formula ($I^A$):

X may represent O or S; and/or $R_1$ may represent a linear or branched $C_1$-$C_4$ alkyl or $C_2$-$C_3$ alkenyl group, or a $C_5$-$C_6$ cycloalkyl or a $C_5$-$C_6$ cycloalkenyl group; and/or m may be 1; and/or $R_2$ may represent H, a halogen atom or a linear or branched $C_1$-$C_4$ alkyl group.

For example, in the polar aprotic solvent having the formula ($I^A$), $R_1$ may represent methyl, ethyl, n-propyl, vinyl or cyclohexyl.

For example, the polar aprotic solvent may have the following formula:

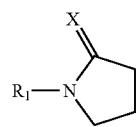

where X represents O or S, and $R_1$ represents a linear or branched $C_1$-$C_6$ alkyl or $C_2$-$C_6$ alkenyl group, or a $C_3$-$C_6$ cycloalkyl or a $C_5$-$C_6$ cycloalkenyl group. For example, $R_1$ may represent a linear or branched $C_1$-$C_4$ alkyl or $C_2$-$C_3$ alkenyl group, or a $C_5$-$C_6$ cycloalkyl or a $C_5$-$C_6$ cycloalkenyl group. For example, $R_1$ represents methyl, ethyl, n-propyl, vinyl or cyclohexyl.

For example, in the polar aprotic solvent having the formula ($I^A$) X represents O and the polar aprotic solvent used in the step b) is N-methyl-2-pyrrolidinonne (NMP), N-ethyl-2-pyrrolidinone, N-cyclohexyl-2-pyrrolidinone or N-vinyl-2-pyrrolidinone.

According to one embodiment, in the polar aprotic solvent having the formula ($I^A$) X represents S and the polar aprotic solvent used in the step b) is N-methyl-2-pyrrolidinethione (NMP), N-ethyl-2-pyrrolidinethione, N-cyclohexyl-2-pyrrolidinethione or N-vinyl-2-pyrrolidinethione.

The polar aprotic solvent used in the step of mixing b) can have the following structure ($I^B$):

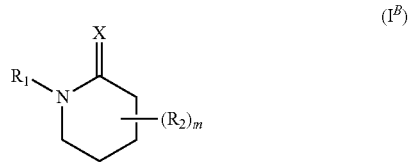

wherein m represents 1 or 2;

X represents O or S:

$R_1$ represents H, a linear or branched $C_1$-$C_6$ alkyl or $C_2$-$C_6$ alkenyl group or a $C_3$-$C_6$ cycloalkyl or $C_5$-$C_6$ cycloalkenyl group; and $R_2$ represents H, a halogen atom, a linear or branched $C_1$-$C_6$ alkyl or $C_2$-$C_6$ alkenyl group, a $C_3$-$C_6$ cycloalkyl or $C_5$-$C_6$ cycloalkenyl group or an —OR group where R represents a linear or branched $C_1$-$C_6$ alkyl or $C_2$-$C_6$ alkenyl group, a $C_3$-$C_6$ cycloalkyl or $C_5$-$C_6$ cycloalkenyl group.

Advantageously, in the polar aprotic solvent having the formula ($I^B$), $R_1$ may represent a linear or branched $C_1$-$C_6$ alkyl or $C_2$-$C_6$ alkenyl group, or a $C_3$-$C_6$ cycloalkyl or $C_5$-$C_6$ cycloalkenyl group.

Advantageously, in the polar aprotic solvent having the formula ($I^B$):

X may represent O or S; and/or $R_1$ may represent a linear or branched $C_1$-$C_4$ alkyl or $C_2$-$C_3$ alkenyl group, or a $C_5$-$C_6$ cycloalkyl group or a $C_5$-$C_6$ cycloalkenyl group; and/or m may represent 1; and/or $R_2$ may represent H, a halogen atom or a linear or branched $C_1$-$C_4$ alkyl group.

For example, in the polar aprotic solvent having the formula ($I^B$), $R_1$ may represent methyl, ethyl, n-propyl, vinyl or cyclohexyl.

For example, the polar aprotic solvent has one of the following formulas:

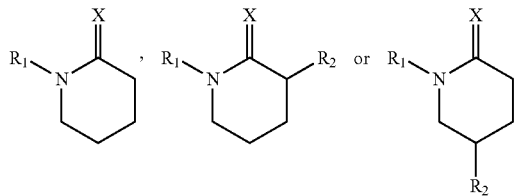

wherein X represents O or S; $R_1$ represents a linear or branched $C_1$-$C_6$ alkyl or $C_2$-$C_6$ alkenyl group, or a $C_3$-$C_6$ cycloalkyl or a $C_5$-$C_6$ cycloalkenyl group; and $R_2$ represents H, a halogen atom, a linear or branched $C_1$-$C_6$ alkyl or $C_2$-$C_6$ alkenyl group, or a $C_3$-$C_6$ cycloalkyl or a $C_5$-$C_6$ cycloalkenyl group, or an —OR group, wherein R represents a linear or branched $C_1$-$C_6$ alkyl or $C_2$-$C_6$ alkenyl group. For example, $R_1$ represents a linear or branched $C_1$-$C_4$ alkyl or $C_2$-$C_6$ alkenyl group, or a $C_5$-$C_6$ cycloalkyl or a $C_5$-$C_6$ cycloalkenyl group; and $R_2$ represents H, a halogen atom or a linear or branched $C_1$-$C_4$ alkyl group. For example, $R_1$ represents methyl, ethyl, n-propyl, vinyl or cyclohexyl; and $R_2$ represents H, methyl, ethyl, n-propyl, vinyl or cyclohexyl. For example, $R_1$ and $R_2$ are identical. For example, $R_1$ and $R_2$ are different. For example, $R_1$ and $R_2$ represent a methyl group.

For example, in the polar aprotic solvent having the formula ($I^B$), X represents O and the polar aprotic solvent used in the step b) is N-methyl-2-piperidinone, 1,3-dimethyl-2-piperidinone, 1,5-dimethyl-2-piperidinone, N-ethyl-2-piperidinone, N-propyl-2-piperidinone, N-cyclohexyl-2-piperidinone or N-vinyl-2-piperidinone.

According to one embodiment, in the polar aprotic solvent having the formula ($I^B$) X represents S and the polar aprotic solvent used in the step b) is N-methyl-2-piperidinethione, 1,3-dimethyl-2-piperidinethione, 1,5-dimethyl-2-piperidinethione, N-ethyl-2-piperidinethione, N-propyl-2-piperidinethione, N-cyclohexyl-2-piperidinethione or N-vinyl-2-piperidinethione.

For example, the polar aprotic solvent can be N-methylpyrrolidone or sulfolane. In a particular embodiment, the polar aprotic solvent is N-methylpyrrolidone (NMP).

In this document, the words N-methylpyrrolidone, N-methyl-2-pyrrolidone and NMP are interchangeable and designate the same solvent having the following formula:

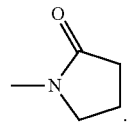

In certain embodiments, the mixing step b) is carried out at a temperature of −22 to 202° C. For example, the mixing step b) is carried out at a temperature of 20 to 25° C.

Generally speaking, the method of the invention, more particularly the mixing step b) can be implemented with or without stirring. When a stirring system is used, it may be a mechanical or magnetic stirring system or sonication. In certain embodiments, the method is carried out with a mechanical stirring. In another embodiment, the method is carried with a magnetic stirring.

It should be noted that, although the method of the invention can be implemented with a stirring system comprising sonication, the latter is not necessary. In fact, a remarkable advantage of the present method is that it is based on a soft dissolution method, starting from neutral graphite, which precisely allows avoiding the use of sonication. Thus, the method of the invention allows obtaining large size graphene planes.

According to a particular embodiment of the method of the present invention, a filtration step (a1) can be performed after step (a) and prior to step (b). For example, when step (a) of the method involves a reduction in the presence of an alkali metal salt obtained from an alkali metal, filtration can allow separating the liquid phase (for example a solution of K+Napht− in THF) from the solid phase comprising the graphite intercalation compound and possibly from any graphite that did not get reduced. The resulting graphite intercalated with an alkali metal can be rinsed one or more times with an appropriate solvent. For example, after the filtration step (a1), the graphite intercalation compound can be rinsed with the same solvent as the one used for the step (a), for example THF. The graphite intercalation compound so rinsed may then be dried prior to step (b).

In certain embodiments, the method further comprises a centrifugation step (b1), which allows separating any non dissolved fraction of the reduced graphene solution after step (b). The person skilled in the art will know how to determine appropriate centrifugation conditions to obtain a clear reduced graphene solution, i.e., not including detectable aggregates. For example, centrifugation can be carried out between 100 and 200 000 g for 0.1 to 24 hours. In certain embodiments, the centrifugation step is carried out at 2 800 g for 1 hour.

According to one embodiment, the presence of aggregates in the solution during centrifugation is checked with the naked eye. Thus, a sample of the solution can be taken at various intervals during centrifugation to determine whether the latter will allow obtaining a clear solution (i.e., without aggregates visible with the naked eye). The naked eye examination allows detecting possible aggregates with a minimal size of the order of one tenth of a millimeter (100 microns).

According to one embodiment, the presence of aggregates in the solution during centrifugation is checked using an optical microscope. Thus, a sample of the solution can be taken at various intervals during the centrifugation step to determine when the latter will have allowed obtaining a clear solution (i.e., without any aggregates visible with an optical microscope). The optical microscope examination allows detecting possible aggregates having a minimal size of the order of one micron. In certain embodiments, a solution sample can be analysed with an optical microscope having a magnification of 20 to 100.

In certain embodiments, the method further comprises a step of depositing reduced graphene planes on a given substrate. Preferably, this depositing step is carried out under inert atmosphere. Once the depositing has been performed and the solvent has been eliminated, the substrate can be exposed to the open air: the graphene planes then interact with the surface and remain stabilised on the surface after re-oxidation to a neutral state (see FIG. 3).

The grapheme depositing step can be carried out by a simple deposition of a quantity of graphene solution on a substrate, followed by the evaporation of the polar aprotic solvent used in step (b) so as to isolate the graphene planes. For example, the reduced graphene solution according to the invention can be deposited on a given substrate and the solvent evaporated under inert atmosphere. Thus, it is possible to obtain graphene planes deposited on the substrate after evaporation of the polar aprotic solvent.

Graphene depositing can also be carried out by application, for example using a brush or any other tool allowing the deposition of a graphene solution film onto a given substrate.

Graphene depositing can also be carried out by dip-coating. For example, the substrate can be dipped into the graphene solution for some time so as to allow the absorption of graphene planes on the surface of the substrate. The substrate is then removed from the solution, preferably with a uniform speed to obtain a uniform coating, and the solvent is then evaporated.

Graphene depositing can also be implemented by spin coating. For example, a droplet of graphene solution can be deposited on a rotating substrate, optionally at high temperature. Preferably, the rotation is kept constant during the whole process so as to obtain a uniform coating, and the solvent is then evaporated. When the spin coating is carried out at high temperature, the temperature can be between 10 and 200° C.

Graphene depositing can also be implemented by deposition and drying of a drop of solution (drop-casting). For example, a drop of graphene solution can be deposited onto a substrate. The solvent droplet may then be subjected to evaporation, optionally at a high temperature depending on the solvent to be evaporated.

Such methods are known to the persons skilled in the art who will know how to adapt the experimental conditions depending on the parameters such as the nature of the substrate, interactions between the substrate and the graphene planes, the wettability of the substrate by the solvent, and other relevant parameters the persons skilled in the art will appreciate.

The substrates that may be used include, in a non limiting way, ceramics, metals, glass, silica, molybdenite (MoS2), mica, graphite and/or plastics. In one embodiment, the substrate can be any known substrate which is used and/or adapted to depositing carbon nanotubes or graphene planes. For example, the substrate can be HOPG (highly oriented pyrolytic graphite), $Si/SiO_2$, mica or $MoS_2$.

In certain embodiments, the substrate can be functionalised or modified prior to depositing graphene. Specifically, the inventive method involves the dissolution of a graphite intercalation compound obtained by the reduction of graphite with an alkali metal (step b). The graphite intercalation compound is composed of negatively charged graphene planes intercalated with alkali metal cations. Thus, the graphene dissolved in a polar aprotic solvent according to the method of the invention exists in the form of negatively charged sheets. Electrostatic interactions can interfere between the graphene sheets and the substrates upon the depositing step, depending on the state of the substrate surface. More particularly, unfavourable interactions may occur if the substrate comprises negative charges on the surface.

For example, the modification of the substrate surface can be carried out by exposing the substrate to an ionic solution containing cations that may participate in an ionic exchange with the alkali metal cations existing on the exfoliated faces of the reduced graphene sheets, thereby resulting in a positive polarisation of the substrate surface when the latter is contacted with the reduced graphene solution resulting from step b). For example, the substrate surface may be modified by dip-coating in the ionic solution. The substrate can then be dried to evaporate the solvent of the ionic solution prior to depositing the reduced graphene solution.

The person skilled in the art will know how to select the appropriate ionic solutions for this purpose and can draw for example from Ill et al., Biophys. J; 1993, 64: 919-924 [ref 46] for an exemplary reduction to practice of this concept.

For example, when the alkali metal of step a) is potassium, an aqueous $NiCl_2$ solution can be used. After dip-coating the substrate into the $NiCl_2$ solution, the substrate can be dried (for example, under vacuum, optionally by raising the temperature to speed up water evaporation). Thus, after depositing the reduced graphene solution, $Ni^{2+}$ ions previously deposited onto the substrate surface can participate in an ionic exchange with potassium ions ($K^+$) present on the exfoliated faces of the reduced graphene sheets resulting from step b).

The substrate can also be modified by depositing a monomolecular layer of a compound to obtain a hydrophobic surface. For example, the substrate (e.g., mica) can be coated with a polylysine layer according to protocols well-known to the person skilled in the art.

Other types of surface modifications of substrates can also be considered. Generally speaking, any surface modification method known to the person skilled in the art can be used. The selection of the modification type will depend on the nature of the substrate, the polar aprotic solvent used to solubilise graphene and the desired physico-chemical interactions at the substrate surface for improving the quality of the graphene deposits.

Method steps a) and b) are always carried out under inert atmosphere. "Inert atmosphere" as used herein refers to a gas or a gaseous mixture which does not favour re-oxidation of the reduced graphene planes into neutral graphene planes. For example, the method is carried out under an oxygen gas free gas atmosphere. For particularly, the method can be carried out under an argon or nitrogen atmosphere.

Thus, the present invention also provides graphene obtainable by a method according to the invention. The graphene can be in the form of isolated graphene planes and/or graphene strips. For example, the graphene planes can be deposited onto a substrate or can be mixed with another material.

The present invention also relates to the use of graphene or graphene solutions obtainable by the method of the invention, for the preparation of composite materials.

According to one embodiment, the composite material is obtained by a method including a step of mixing a graphene solution and a polymer solution or a polymer mixture.

According to one embodiment, the composite material is obtained by a method comprising a step of in situ polymerisation of a monomer or a mixture of monomers in a graphene solution. Such polymers and methods for their preparation are described for example in Matyjaszeski, K.; Eds. Advances in Controlled/Living Radical Polymerisation, (American Chemical Society 2003) [ref 26]; Hsieh, H. L.; Quirk, R. P.; Eds.; Anionic Polymerisation Principles and Practical Applications, (Marcel Dekker 1996) [ref 27]; Matyjaszewski, K.; Davies, T. P; Eds.; Handbook of Radical Polymerisation, (Wiley-Interscience 2002) [ref 28] or Fontaine, L.; Initiation à la chimie et à la Physico-Chimie Macromoléculaires (Groupe Français d'Etudes et d'Applications des Polymères volume 12 (Chapitre 3)) [ref 29].

According to one embodiment, the composite material is obtained by a method comprising a step of polymerisation-grafting of one or more monomer(s) on one or more graphene plane(s). Polymerisation-grafting methods are well known in the art. The person skilled in the art will know how to identify appropriate experimental conditions for polymerisation-grafting a monomer on one or more graphene plane(s).

In certain embodiments, the graphene is grafted with one or more functional groups prior to being associated with the polymer or polymers. In this context, "association" refers to the combination of the grafted graphene with the polymer or polymers by mere mixing, by in situ polymerisation of a monomer or mixture of monomers in a grafted graphene solution, or by polymerisation-grafting of one or more monomer(s) onto one or more grafted graphene plane(s). The attachment of said functional groups on graphene can be carried out by any appropriate method of organic chemistry known to the person skilled in the art, for example those described in references 23 and/or 31. For example, it can be effected by grafting polyethylene glycol group or acid groups. Such grafting can (i) allow functionalising isolated graphene planes, (ii) increase interactions between graphene planes (Van der Waals type bonds, hydrophobic bonds or hydrogen bonds), and/or (iii) increase interactions between graphene planes and the polymer or polymers to which they are associated, and they can have the advantage of reinforcing composite materials comprising such graphene planes.

According to the invention, the polymer can be any polymer that allows reducing to practice the present invention. It can be selected for example from the group comprising polystyrene; polyolefines, for example polyethylene, polypropylene, poly(alpha-olefine)s, polyisobutene and polypropylene; polyethers; polyesters; polyamides; polyacrylamides; polyacrylates; polysilanes; polysiloxanes.

According to the invention, the polymer can be a linear block copolymer or a statistic copolymer. The person skilled in the art will know how to identify appropriate experimental conditions, and the polymer or polymers to be used, to obtain a composite material having the requisite/desired properties. For example, the person skilled in the art can draw from the methods described in FR 04/05120 [ref 42] and/or WO 2006/136715 [ref 43] which describe the preparation of composite materials from carbon nanotubes and polymers or polymer mixtures. The person skilled in the art will know how to adapt the methods described in these documents to prepare composite materials from graphene obtainable by the method of the present application. The polymer or polymers can be selected so as to optimise the surface interactions of graphene/polymer, and to allow a better dispersion of graphene into the polymer matrix. Such materials can be used for example in paint or solvent formulations, in coatings or as additive or anti-static materials.

"Block copolymers" as used herein refers to a sequenced polymer comprising more than one type of monomer. In a block copolymer, identical monomers are grouped together. Such polymers and methods for their preparation are described for example in Matyjazewski, K.; Eds.; Advances in Controlled/Living Radical Polymerisation, (American Chemical Society 2003) [ref 26] or Hsieh, H. L.; Quirk, R. P.; Eds.; Anionic Polymerisation Principles and Practical Applications, (Marcel Dekker 1996) [ref 27].

"Statistic copolymer" as used herein refers to a polymer in which the various monomers mix depending on their reactivity and concentration. Such polymers and methods for their preparation are described for example in Matyjaszewski, K.; Davies, T. P; Eds.; Handbook of Radical Polymerisation, (Wiley-Interscience 2002) [ref 28] or Fontaine, L.; Initiation à la chimie et à la Physico-Chimie Macromoléculaires (Groupe Français d'Etudes et d'Applications des Polymères volume 12 (Chapitre 3)) [ref 29].

According to the invention, when a block copolymer is involved, it can be a 2-block copolymer synthesized for example by controlled radical polymerisation or live anionic polymerisation or live cationic polymerisation, or a statistic copolymer synthesized by controlled radical polymerisation or non-controlled radical polymerisation.

Controlled radical polymerisation (CRP) is a method of choice for preparing well-defined polymers and copolymers with adjustable molar masses and low polymolecularity indexes. Techniques that can be used in the present invention are for example described in Matyjaszewski, K.; Davies, T. P; Eds.; Handbook of Radical Polymerisation, (Wiley-Interscience 2002) [ref 28].

"Live polymerisation" as used herein refers to a polymerisation in which there is neither termination reactions nor transfer reactions, and where polymer chains keep on growing as long as there remains free monomer molecules to be added to chains. According to the invention, live polymerisation can be cationic or anionic. Such methods are described for example in Matyjaszeski, K.; Eds. Cationic Polymerisation Mechanisms, Synthesis and Applications, (Marcel Dekker 1996) [ref 30] or Hsieh, H. L.; Quirk, R. P.; Eds.; Anionic Polymerisation Principles and Practical Applications, (Marcel Dekker 1996) [ref 27].

Monomers can all be introduced during the step of polymerisation. They also can be introduced separately or in a mixture, continuously or discontinuously. A supplemental monomer can also be introduced at the end of the polymerisation process, to obtain the desired polymer composition.

The additives that are optionally incorporated during conventional polymerisation methods can be used according to the method of the invention. Thus, initiators, chain transfer agents, catalysts, antioxidants and lubricants known to the person skilled in the art can be used.

In certain embodiments, the method may further comprise a step during which graphene is functionalised with one or more graft(s) of functional group(s). The attachment of said functional groups on the graphene can be carried out by any appropriate method of organic chemistry known to the person skilled in the art. Methods which can be used to attach or form the functional groups on the graphene are described for example in documents such as Chakraborty et al., Angew. Chem. Int. Ed., 2007, 46, 4486-4488 [ref 23] or Stankovitch et al., Nature, 2006, 442, 282-286 [ref 31]. For example, it may be grafts of polyethylene glycol groups or acid groups. Such grafts can (i) allow functionalization of isolated graphene planes, and/or (ii) increase interactions between graphene planes (Van der Heals type bonds, hydrophobic bonds or hydrogen bonds) and can have the advantage of reinforcing composite materials comprising such graphene planes.

According to one embodiment, the graphene and/or graphene solution obtainable by the method of the invention can be used for preparing electronic or microelectronic components such as capacitors or transistors.

According to certain embodiments, the graphene and/or the graphene solution obtainable by the method of the invention can be used for preparing carbon nanotubes. Specifically, the method of the invention allows obtaining reduced graphene solutions, i.e. solutions of negatively charged graphene planes. Such negative charges on the surface of graphene planes prevent planes from scrolling onto themselves because of the electrostatic repulsions. Thus, if these solutions are oxidised (for example through exposure to air), the graphene planes lose their electric charges and return to a neutral state. The unstable planar shape then spontaneously breaks into a scroll shape (nanoscrolls). Thus, carbon nanotubes can be obtained by oxidation of the graphene solutions described in the present application, for example by exposure to air. The carbon nanotubes can be multi-walled. The starting material, graphite, being abundant, the nanotubes obtained by this method have the advantage of being much less expensive than those obtained by the conventional ways (laser ablation, electric arc).

According to certain embodiments of the use of graphene or graphene solutions for preparing composite materials, the composite material may comprise, in addition to the graphene particles, other materials conventionally used in composite materials. For example, the composite material may contain carbon nanotubes, in addition to graphene obtainable by the method of the present invention. Such carbon nanotubes can be obtained by conventional manufacturing methods, for example by laser ablation and/or electric arc. They can be in the form of a solution in a polar aprotic solvent such as described in documents Penicaud et al., "Spontaneous dissolution of a single-wall carbon nanotube salt", J. Am. Chem. Soc., 27, 8-9, (2005 [ref 32]; WO 2005/073127 [ref 33]. Or they can be obtained from the method of the present invention by re-oxidation of graphene solutions to form nanoscrolls.

The fillers used in the composition of said composite materials, including graphene obtainable by the method of the present invention, can have a nanometric and/or micrometric size.

"Nanometric size material" a used herein refers to a material whose size is of a few nanometers in at least one of the space dimensions. For example, the size of the material in at least one of the space dimensions is between 1 and 20 nm, preferably between 1 and 2 nm.

"Micrometric size material" a used herein refers to a material whose size is between 1 and 100 microns.

The composite material may comprise only micrometric size fillers, or only nanometric size fillers, or a mixture of micro and nanometric size fillers (see for example FR 2 873 381 [ref 34] where composite materials comprising nano- and micro-metric fillers in the same material are described).

The method described in the present document solves the current major problems that hamper the research developments in the field of graphene: the lack of samples and difficulties in applications.

Since 2004, graphene has led to numerous studies because of the interest prompted by its the electronic properties. [ref 18, ref 19]. However, most of these studies remain theoretical because of the difficulty to prepare samples.

On the other hand, the first investigations towards composite materials by reduction of graphite oxide have been reported (Stankovitch et al., Nature, 2006, 442, 282-286 [ref 31]).

The inventors of the present invention are the very first investigators to develop a graphite dissolution method. From an industrial point of view, clearly the possibility to obtain graphene solutions is an important element in the nanotechnologies and composite materials industries, since it is a crucial element for pushing technical progress forward in this field.

In certain embodiments, the present inventors successfully obtained for the first time the spontaneous exfoliation of intercalated graphite by dissolution in NMP. As such, this discovery opens up two promising ways in the field of graphene: the availability of graphene plane solutions opens broad perspectives for the preparation of composite materials by mixing with polymers or in situ polymerisation in graphene solutions. Graphene plane depositing on substrates, which can readily be carried out on a large scale thanks to the present discovery, can now become a routine technique and can allow fully exploring the electronics of graphene, with deposits controlled by self-assembling, field coating, etc. . . . .

As illustrated in Example 1 below, a ternary GIC having the formula $K(THF)_yC_x$ was obtained by reducing graphite in a naphthalene potassium salt solution ($K^+Naph^-$) in THF, under inert atmosphere. The resulting GIC was isolated by filtration, rinsed and dried, and was dissolved in N-methyl pyrrolidone (NMP). After elimination of insoluble aggregates by centrifugation, a solution was obtained. In Example 1, this red coloured solution is made off reduced graphene planes dissolved in the solvent in question. If this solution is exposed to air, it quickly turns to clear yellow, then within a few days it becomes colourless.

Generally, these solutions are coloured and contain reduced graphene planes dissolved in the particular solvent. When these solutions are exposed to air, they become colourless, for example within a few days.

This discovery goes against the preconceived notion of the person skilled in the art according to which graphite was considered too stable a material to be dissolved in solution. One important aspect of the method of the present application partly resides in trying to dissolve graphite intercalation compounds in polar solvents. This had never been considered, or considered as viable, over the last thirty years of experimental research on graphene.

Deposited graphite planes (reduced graphite planes) may be obtained by drying said graphene solution in NMP on a substrate, still under inert atmosphere. These graphite planes can find applications in the field of electronics or optoelectronics.

Once dried, the deposited graphite planes can be exposed to air. FIG. 3 shows a low resolution tunnelling microscopy image (STM) of the solution in NMP, after it has been dried and oxidised. Small platelets deposited on the substrate can be observed. These platelets have characteristic angles, multiple of 30°, which are expected if a graphene plane is cut along a row of carbon atoms. In addition, the height measurements show that most objects have a height of 0.35 nm, and a few have heights double or triple that. This corresponds exactly to the height that is expected, the distance between planes in graphite being 0.34 nm. (Bernal, J. D., Proc. Roy, Soc., A, 106, 749, (1924) [ref 35]; Freise, E. J. "Structure of graphite", Nature (London) 193, 671-672, (1962) [ref 36]).

FIG. 4 represents a tunnelling microscopy picture (STM) of a graphene deposit on a HOPG substrate obtained by drop-casting an NMP solution of reduced graphene obtained from graphite particles resulting from filing down a graphite electrode, according to the method of the invention. As shown in the top right insert in FIG. 4, the difference in height between the surface of HOPG and the graphene plane is 0.36 nm, which corresponds to the expected height, the distance between planes in graphite being 0.34 nm.

It should be noted that the method of the invention not only allows obtaining isolated graphene planes, as explained above, but also graphene strips as shown in FIGS. 5 and 6. Such strips can be 20 to 100 microns in length and ≤1 micron in width. For example, strips ≤500 nm, ≤100 nm, ≤50 nm or even ≤10 nm in width can be obtained. Like carbon nanotubes and graphene planes, such strips can find applications in the electronics or optoelectronics field more particularly the strips which are ≤10 nm in width. (See Hongjie Dai et al., Science, 319:1229-1232 (2008) [ref 45]).

FIG. 5 shows an atomic force microscopic picture (AFM) of a graphite deposit obtained by dip-coating an NMP solution of reduced graphene on an Si/SiO$_2$ wafer according to Example 5. The reduced graphene solution was obtained from expanded graphite according to the method of the invention. In this Figure, three parallel graphene strips can be seen with an average thickness of approximately 1.2 nm (height measurements between 0.8 and 1.3 nm).

FIG. 6 shows an atomic force microscopic picture (AFM) of a graphene deposit obtained by dip-coating an NMP solution of reduced graphene on a nickel-modified-surface mica substrate (see Example 5). The reduced graphene solution was obtained from expanded graphite according to the method of the invention. In this Figure, the end of a graphene strip similar to those seen in FIG. 5 can be observed. The entire object can be followed along its whole length which is approximately 40 microns. It should be noted that the measured height of this graphene strip deposited on mica is approximately 0.4 nm, which is approximately a theoretical thickness of a graphene plane.

An isolated graphene plane in a symmetrical environment such as a solution is intrinsically instable.

By "symmetric environment" it is to be understood that both faces of the graphene plane are equivalent, in that they "see" the same thing. On the contrary, a graphene plane deposited on a substrate has two non equivalent faces: one face is in contact with the substrate, the other is in contact with the fluid (gas or solution) above it or with vacuum if the whole thing is under vacuum.

Thus, under the action of Van der Waals forces, the graphene plane spontaneously curves to lead to "nanoscrolls" or scrolled carbon nanotubes (Viculis et al., "A chemical route to carbon nanoscrolls", Science, 299, 1361 (2003) [ref 37]. After reduction with potassium, graphite planes are negatively charged, which prevents any curvature because of the electrostatic repulsions. If the solutions are let to re-oxide, the graphene planes lose their electrical charges and return to a neutral state. A planar shape then spontaneously breaks into a scrolled shape (nanoscrolls), Then, once they are deposited on a substrate, the graphene planes can be re-oxided and they return to a neutral state: they are stabilised by the interaction with the surface (as in the case in mechanical exfoliation [ref 18 and 19]).

STM pictures are conclusive from this point of view (FIGS. 3 and 4): many objects can be seen, the thickness of which is exactly the expected one for a single graphene plane (0.34 nm with reference to the interplane space of the graphite). A few thicker objects show double thickness (0.7 nm) or triple thickness (1.05 nm), corresponding to two or three graphite planes, respectively (FIG. 3).

In summary, the negative charges on the graphene planes prevent planes to scroll because of the electrostatic repulsions. Thus, the graphene solutions obtainable by the method of the present invention are stable. With these solutions, the scientific and industrial community will thus have at its disposal, not just a few isolated planes on a surface, but an unlimited quantity of graphene planes dissolved in a suitable solvent (for example NMP).

If, on the contrary, the solutions are exposed to air, the graphene planes re-oxyde, return to a neutral state and lead to multi-wall nanotubes by scrolling of planes (nanoscrolls).

Thus, the method of the present invention very advantageously leads to the first (to our knowledge) true solutions of isolated graphene planes and/or isolated graphene strips.

These solutions have an extraordinary potential with respect to the intense research efforts on graphene that are ongoing worldwide since 2004 (Novoselov et al., "Electric field effect in atomically thin carbon films", Science 306, 666 (2004) [ref 22]). The method of Novoselov et al. consists in obtaining a few graphene planes on a surface by an original graphite shearing method, the planes being stabilised on a surface, which makes it difficult to handle them subsequently, for example for their incorporation into a matrix.

However, as the person skilled in the art will see upon reading the present description, one of the main advantages of the present invention is the simple implementation of the method, as well as its capacity to supply unlimited quantities of reduced graphene planes. Such graphene planes further have the particularity that they can be obtained in a charged form. Thus, these graphene sheets repel each other and cannot aggregate. They are thus stable in a solution according to the method of the invention.

It should also be noted that graphene, like carbon nanotubes, has extraordinary properties (with respect to thermal and electric conductivity as well as mechanical properties). From an electrical point of view, electricity readily circulates in graphene. Thus, in addition to a gain in space, it could also mean a gain with respect to transistors reactivity. Specifically, graphene transistors in combination with carbon nanotubes interconnections will tremendously benefit the information processing industry.

The availability of low cost graphite as a graphene precursor allows access to high performance composite materials that are much cheaper than those using carbon nanotubes today.

Furthermore, in a second aspect, the re-oxydation of graphene planes obtained by the method of the invention leads to multi-wall carbon nanotubes of the nanoscrolls type (wound in scrolls). Currently, important synthetic efforts are directed towards multi-wall nanoscroll nanotubes (Arkema, Bayer, Thomas, Swan Inc., Nanocyl, etc. . . . ). The grapheme solutions described in the present application would offer a high quality alternative solution (without impurities) and at low cost, thus rendering possible the development of large volume applications involving multi-wall carbon nanotubes.

With respect to the synthesis of multi-wall nanoscroll nanotubes, from an industrial point of view, there clearly is a high interest in having the capability of preparing nanotubes at low cost and with no impurities, especially since graphite is very pure to start with. The range of the applications that can be considered would be all the applications that are possible with multi-wall carbon nanotubes.

Therefore, as the person skilled in the art will appreciate upon reading the present document, many of the applications for the solutions of graphene and/or graphene monosheets obtained according to the method of the invention, will relate to those which are also considered for carbon nanotubes, the cost of which is still very high today.

For example, like carbon nanotubes, solutions of graphene and/or graphene mono-sheets obtained by a method of the invention can be used in composite materials, hydrogen cells, supercapacitors, sensors, catalysis, NEMS (nanoelectrochemical systems) and electronic components/systems of nanometric size.

With respect to sensors and signal processing in general, graphene can be an important asset because of its unique electronic properties, as the article by Schedin et al. attests, "Detection of individual gas molecules absorbed on graphene", published on Jul. 29, 2007 in the Nature magazine [ref 44]. Thus, the use of grapheme obtainable according to the present method in sensors extends the scope of application of the present method to fields as diverse as transportation, the nuclear industry or healthcare, where sensors are very often used.

Nanostructural materials, such as carbon nanotubes, have important applications in reinforcing materials. One of the objectives of composite materials is to develop extremely resistant yet light materials which can replace steel (Dai, L.; Mau, A. W. H. "Controlled Synthesis of Modification of Carbon Nanotubes and C60: Carbon Nanostructures For Advanced Polymeric Composite Materials", Adv. Mater., 13, pp 899-913 (2001) [ref 38]). The weak point of any composite material is the polymer matrix itself. The basic purpose of composite materials is to reinforce the polymer matrix, while maintaining its properties of ultra-light material. The impregnation of the polymer matrix with a nanomaterial allows transferring the load from the matrix to the nanomaterial (Calvert, P. "A Recipe For Strength". Nature, 399, pp 210-211 (1999) [ref 39]). Existing technologies use macroscopic carbon fibres where graphite crystallites are oriented in the direction of fibres, the fibres being embedded in the polymer matrix (Lake, M. L.; Ting, J.-M, "Vapor Grown Carbon Fiber Composites", Carbon Mater. Adv. Technol. pp 139-167 (1999) [ref 40]). One of the limitations of this technique is that, as the strength of the composite material increases, its ductility is reduced because of a lack of flexibility. Because of the high flexibility of graphene planes, the use of graphene planes obtainable by the methods of the invention in nanocomposite materials allows increasing the resistance of composite materials without reducing their flexibility, or at least by affecting it to a lesser degree.

Graphite based composites have been the subject of studies. They deal with composites obtained by dispersion of oxidised then re-reduced graphite into polymers. (Stankovitch et al., "Graphene based composite materials", Nature, 442, 282-286 (2006) [ref 31]). The authors obtained composites having high electric conductivity and thermal conductivity performances. However, the graphene planes obtained/used by Stankovich et al., were damaged by the oxidation process. On the contrary, the method of the invention, which merely involves adding electrons on graphene planes, preserves the structural integrity of graphene planes as they were in graphite.

In addition, as graphite is available in huge quantities, pure and cheaply, the method described in the present application allows considering low cost composites by mixing these graphene solutions with polymers. As mentioned previously, such composites have a high potential as mechanical reinforcement because of the extraordinary mechanical properties of graphene planes (the Young module of carbon nanotubes is no different than that of graphene).

Self-diagnosing composites can also be considered, in which the reinforcing element (=graphene) could also be used as a probe for temperature, pressure, stress, chemical environment, etc. Such composites could also be very useful in sensitive fields such as aeronautics or the space industry.

Other advantages will readily appear to the person skilled in the art upon reading the examples that follow, as illustrated by the appended Figures given for illustrative purposes.

BRIEF DESCRIPTION OF THE FIGURES

FIG. 6 shows an atomic force microscopy picture (AFM) of a graphene deposit obtained by dip-coating an NMP solution of reduced graphene on nickel-modified-surface mica.

EXAMPLES

Figure 1:
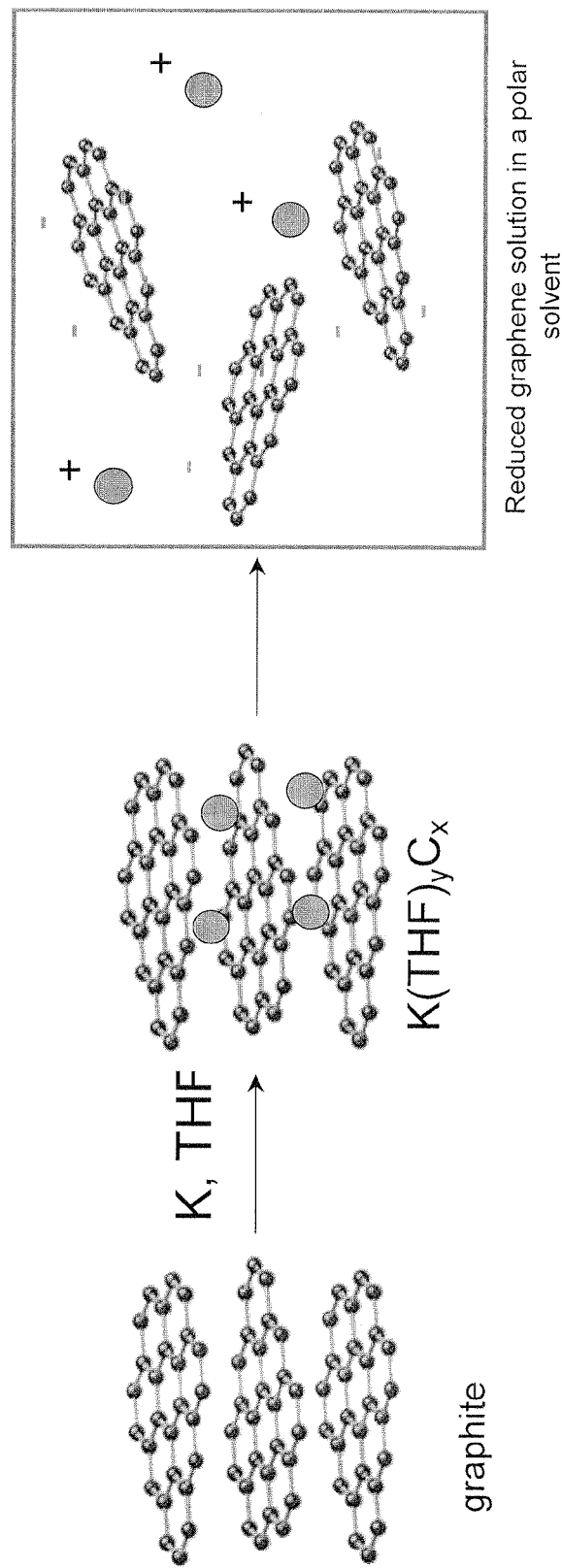
FIG. 1 schematically illustrates one embodiment of the invention. In the illustrated example, graphite is reduced by a potassium compound (for example a potassium naphthalene salt) in the presence of THF to lead to a graphite intercalation compound. The latter is isolated for example by filtration and is dissolved in a polar aprotic solvent such as NMP to form a reduced graphene solution.
Figure 2:
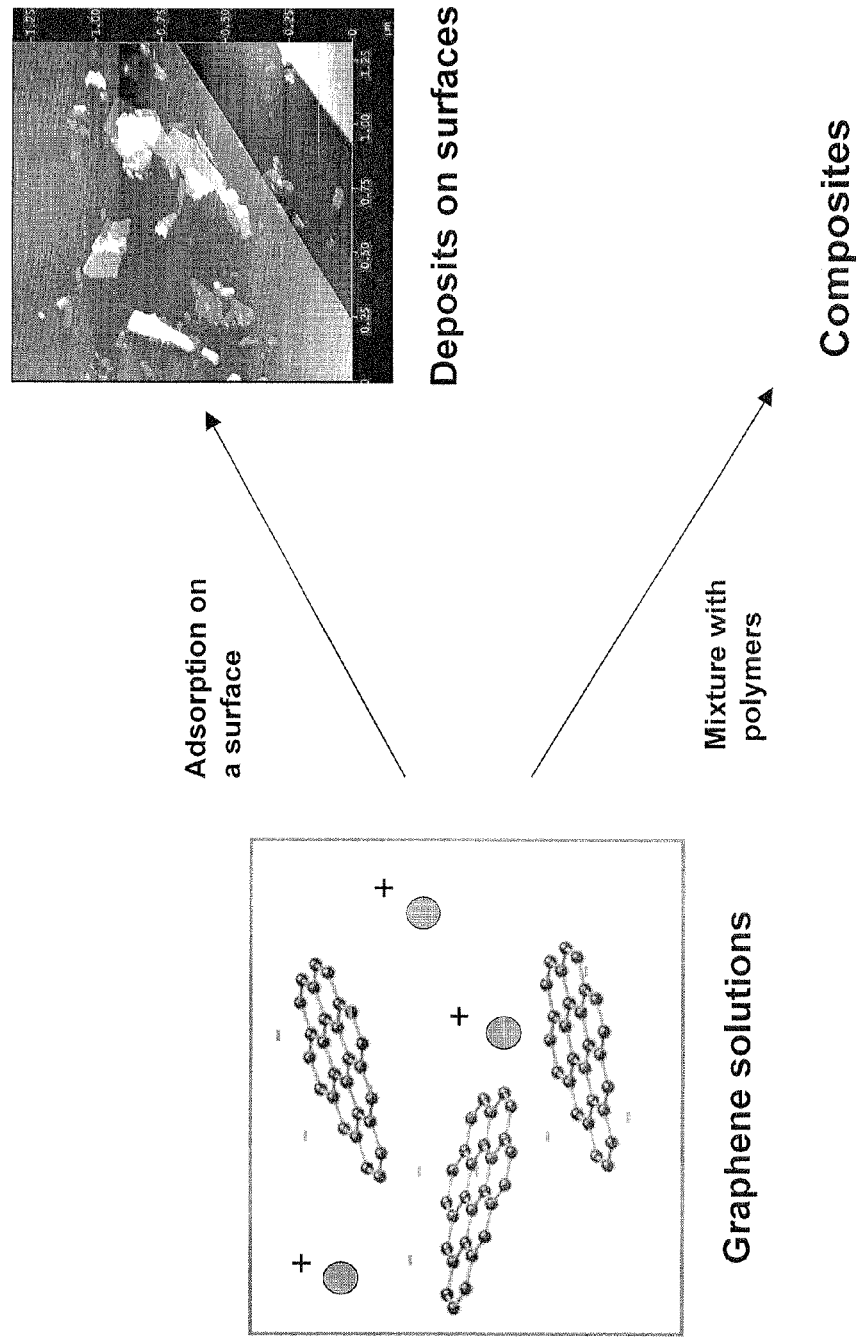
FIG. 2 shows two possible applications, among others, of reduced graphene solutions of the present application: (i) the deposit of graphene planes on a substrate and (ii) incorporation of said graphene planes in a polymer or a mixture of polymers for the preparation of composite materials.
Figure 3:
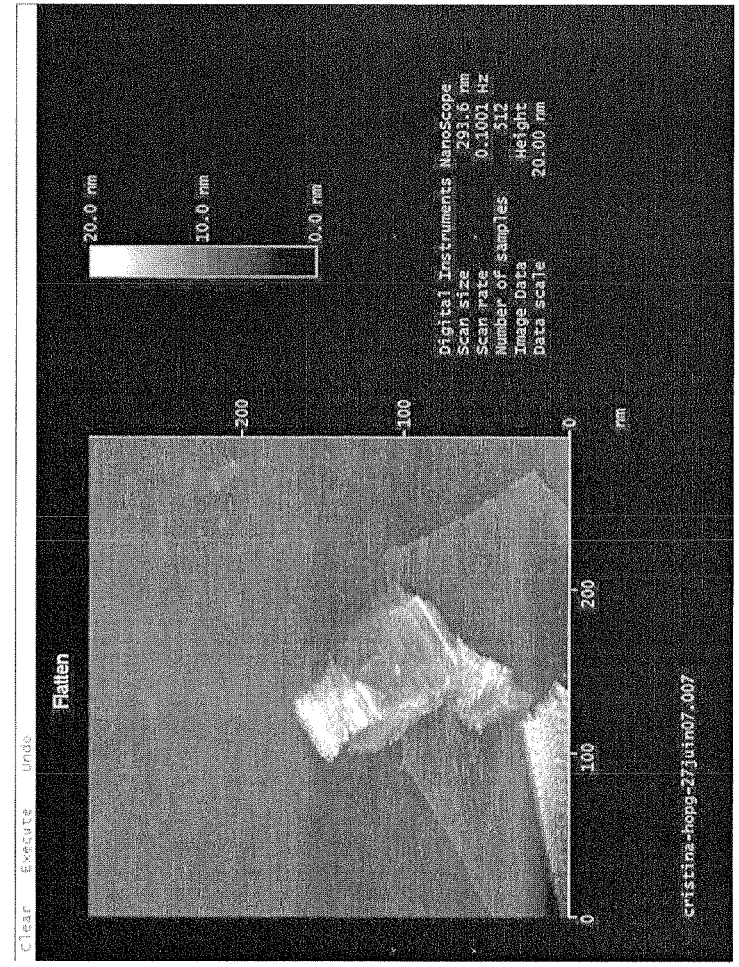
FIG. 3 shows a tunnelling microscopy picture (low resolution) of the deposit obtained by drying a solution of $K(THF)_yC_x$ in NMP. The substrate is HOPG graphite (highly oriented pyrolytic graphite); the solution of NMP has been diluted twice with acetone. The height of the large platelet with reference to the substrate is 0.35 nanometers.
Figure 4:
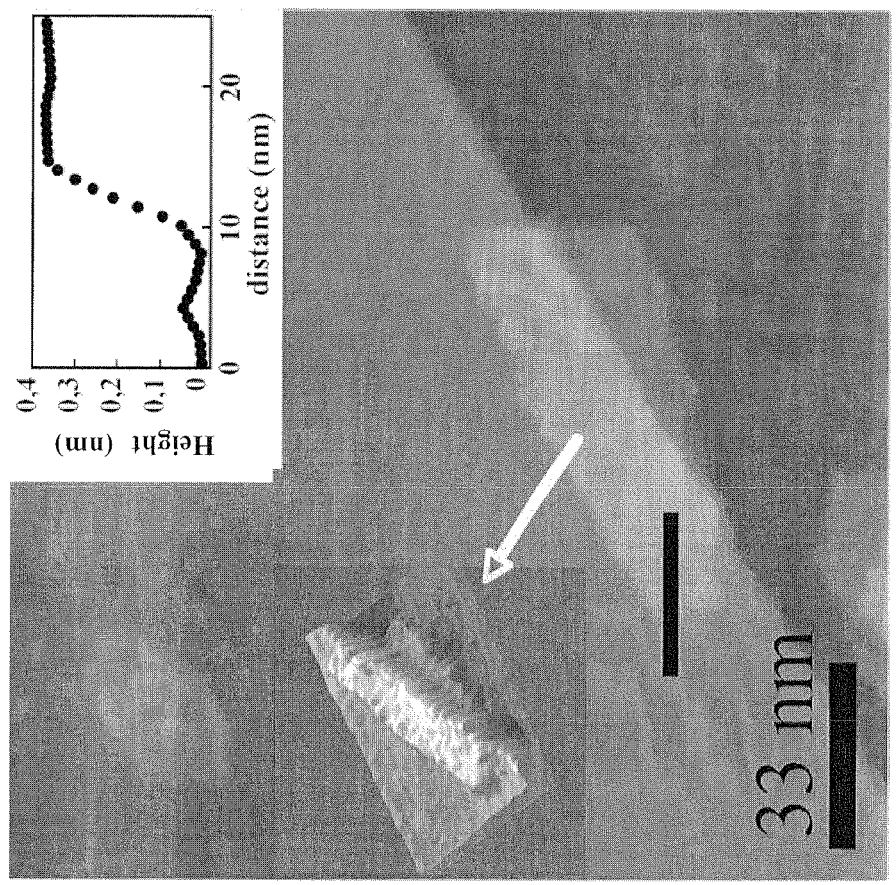
FIG. 4 shows a tunnelling microscopy picture (STM) of a graphene deposit on a HOPG substrate by drop-casting an NMP solution of reduced graphene according to the method of the invention, obtained from graphite particles from graphite electrodes.
Figure 5:
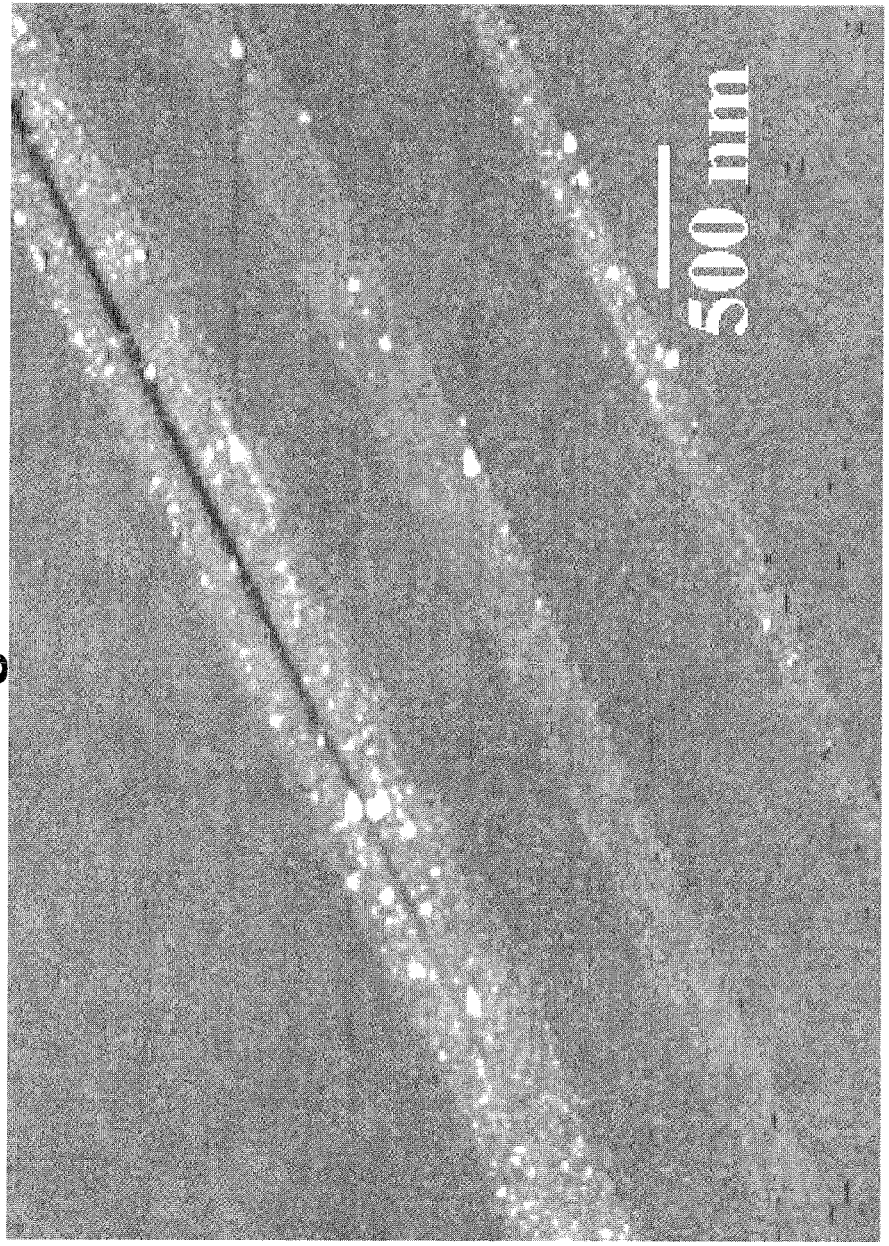
FIG. 5 shows an atomic force microscopy picture (AFM) of a graphene deposit obtained by dip-coating an NMP solution of reduced graphene on an $Si/SiO_2$ wafer.

Unless otherwise stated, all the experiments are carried out under inert atmosphere, for example under argon or nitrogen. In particular, manipulations are performed in a glove box under a dried argon atmosphere ($O_2$ content<10 ppm, $H_2O$ content<10 ppm).

Example 1

Preparation of a Solution of Graphene Potassium Salt from Expanded Graphite

Preparation of Naphthalene Potassium Salt ($Naph^-K^+$)

39 mg of potassium in small pieces with shiny surfaces (peeled with a scalpel just prior use) and 133 mg of naphthalene (~1 mmol), i.e. in a molar ratio of approximately 1:1, were placed with approximately 100 cm³ distilled THF under mechanical stirring. The solution was heated to reflux until it turned green, then dark green, and finally black after a few minutes of reflux. To ensure completion of the reaction, the solution was kept under reflux for 24 hours.

The solution of $Naph^-K^+$ was cooled to room temperature and was filtered to remove any potential traces of solid potassium from the solution.

Preparation of a Ternary Compound $K(THF)_yC_x$ 55.833 g of the $Naph^-K^+$ solution obtained above (containing 0.529 mmol of K) was reacted with 50.8 mg (4.233 mmol) of expanded graphite (in a 8/1 molar ratio). The reaction was kept at a room temperature under mechanical stirring overnight, then the mixture was filtered in vacuo to collect the carbonated material which was then rinsed with purified THF and completely dried. The THE was purified on a column in a glove box (equivalent to distilled solvent).

Preparation of an NMP Solution of Reduced Graphene 5.7 mg of the ternary compound obtained above were dissolved into 2 g of deoxygenated NMP. The dissolution of the ternary compound in the solvent was carried out at room temperature under a mechanical stirring. After several hours, the solution was already coloured (namely a red colour). However, the dissolution reaction was allowed to continue for 24 hours prior to centrifugation of the solution to separate the insoluble fraction (centrifugation conditions: 2800 g, 60 minutes). After settling, an homogeneous solution of reduced graphite was obtained which did not include any visible aggregates.

In this Example, the NMP solution of reduced graphene was red but it turned yellow upon contact with air.

Example 2

Preparation of a Graphene Potassium Salt Solution from HOPG (Highly Oriented Pyrolytic Graphite)

Conditions and protocols similar to those of Example 1 were used, with the difference that the starting graphite was HOPG (Highly oriented pyrolytic graphite).

Example 3

Preparation of a Graphene Potassium Salt Solution from Micrometric Graphite Obtained by Mechanical Wear Conditions and protocols similar to those of Example 1 were used, with the difference that the starting graphite was graphite with a grain size close to a micron, obtained by mechanical wear (e.g., by filing down a graphite electrode).

Example 4

Preparation of a Graphene Potassium Salt Solution from Natural Graphite

Conditions and protocols similar to those of Example 1 were used, with the difference that the starting graphite was natural graphite (from the société Nacional de Grafite in Brazil).

Example 5

Graphene Deposits on HOPG, Mica and Si/SiO$_2$ Wafers a) Preparation of the Graphite Intercalation Ternary Compound Various experiments were carried out from graphite powder from various sources. For each experiment, the following protocol was used:

Graphite powder was mixed with a naphthalene potassium solution in THF using a C/K molar ratio of 8/1 according to the experiment protocol published by Pénicaud et al., J. Am. Chem. Soc. 127, 8-9 (2005) [ref 32]. The reaction mixture was kept under inert atmosphere with a mechanical stirring. After 24 hours, the mixture was filtered in vacuo on a PVDF membrane (0.45 microns) to collect the carbonated material, which was then rinsed with purified THF and dried to completion.

The types of graphite used were as follows:
HOPG
natural graphite
expanded graphite
graphite particles obtained by filing down a graphite electrode.

b) Preparation and Analysis of the NMP Solution of Reduced Graphene

The ternary compound contained in a) above was dissolved in NMP (ca. 0.5 mg/ml) under inert atmosphere, at room temperature and with stirring. After 24 hours, the solution was centrifuged at 4 000 revolutions per minute for 60 minutes to separate the non-soluble material from the graphite salt solution. The coloured upper phase represented the reduced graphene solution in NMP. This solution became colourless when exposed to air.

Elemental analysis of the various solutions (i.e., from the various graphite sources). The potassium content was determined on a Perkin Elmer 3100 atomic absorption (AAS) and flame emission spectrometer using a linear calibration method. The error margin associated with this type of analysis is evaluated at 5%. The elemental analysis of the solutions showed a potassium content of 36 ppm (±10% standard deviation). For the formula K(THF)$_x$C$_{24}$ (x=1 to 3), the total concentration of dissolved graphene carbon may reach 0.26 mgC/ml, which corresponds to 0.36 to 0.49 mg/ml dissolved material depending on the value of x.

If graphene solutions were exposed to air, these became colourless after approximately 2 days.

The analysis of the solutions with optical microscopy did not show aggregates, whereas oxidised solutions showed aggregates of approximately 20 microns in dimensions.

c) Preparation and Analysis of Deposits of Solutions on Substrates

Deposits of the solution obtained in b) above were carried out on various types of substrates by dip-coating the substrate in the solution for approximately 15 to 30 minutes under argon atmosphere, then rinsing with NMP, acetone, water and isopropanol (still under argon atmosphere). The substrates were then taken out of the glove box to be totally dried under a vacuum at 200° C. for 48 hours.

The substrates used are as follows:
SiO$_2$
HOPG ("Highly oriented pyrolytic graphite")
Mica of the muscovite type with a nickel-modified surface
Si/SiO$_2$ wafer ("Surfs", Nanolane, France)

No trace of nitrogen was detected by XPS analysis of the deposits made on SiO$_2$ or HOPG wafers which implied that all the NMP was eliminated by the rinsing process. No potassium was detected. By analogy with C$_{60}$ and the nanotubes, it is assumed that the potassium ions form oxides or hydroxides when exposed to ambient air, which are also eliminated during the rinsing process.

Graphene deposits were characterized by atomic force microscopy (AFM), ambient scanning tunnelling microscopy, (STM), multiple beam interferometry (MBI), optical microscopy, X-ray photoelectron spectroscopy (XPS), high resolution transmission electron microscopy (HRTEM) and Raman spectroscopy. Each of the above mentioned techniques revealed the presence of graphene plane deposits on the analysed substrates.

Preliminary conductivity studies were carried out on inter-digitated dip-coated electrodes which were dip-coated in the solutions prepared as above. The room temperature curves I-V were linear with a resistance of 235 and 370 Ohms for two different devices. This shows the conductive nature of the deposits.

Interferometry: the graphene sample was dip-coated on a freshly cleaved piece of mica of the muscovite type and with a uniform thickness of less than 4 mm, which muscovite type mica piece was previously covered with a 45 nm thick silver layer (Sigma-Aldrich 99.9999%) by thermal evaporation. In order to facilitate the adsorption of negatively charged graphene planes, the mica surface was previously immerged for 30 minutes in 100 nM aqueous $NiCl_2$ solution, then dried so as to favour ionic exchange of $Ni^{2+}$ ions with potassium ions present on the exfoliated faces of the reduced graphene sheets, thus polarising positively the mica surface [ref 46]. The mica-graphene deposit was then covered with a second silver semi-reflecting layer by thermal evaporation.

AFM. The deposits were performed as mentioned above, except that the steps of coating with silver layers were omitted, and they were observed by multimode AFM microscope in tapping mode (Veeco).

Tunnelling microscopy: The deposits were made on freshly cleaved HOPG by drop-casting. The surface of the HOPG wafer was observed just prior to making the deposit to check its quality and cleanliness. Low and high resolution pictures were obtained on Nanoscope III and II instruments, respectively.

Optical microscopy: Deposits were prepared by dipping special $Si/SiO_2$ wafers ("Surfs", Nanolane, France).

Example 6

Graphene Deposits on $MoS_2$ Wafer

An NMP solution of reduced graphene was obtained according to the experimental protocol described in a) and b) in Example 5. Graphene deposits were then made by dip-coating or drop-casting the reduced graphene solution on an $MoS_2$ wafer.

When reading the present application and the above illustrating examples, the person skilled in the art will appreciate that the present method has a general scope and is applicable to all graphites.

LIST OF REFERENCES

[1] Schaffer, M. S. P., Windle, A. H., "Fabrication and Characterization of Carbon Nanotube/poly (vinyl alcohol) Composites", Adv. Mater., 11, pp 937-941 (1999)

[2] Ye, Y., Ahn, C. C., Witham, C., Fultz, B., Liu, J., Rinzler, A. G., Colbert, D., Smith, K. A., Smalley, R. E., "Hydrogen Absorption And Cohesive Energy Of Single-Walled Carbon Nanotubes", App. Phys. Lett., 74, pp 3072309 (1999)

[3] Liu, C., Fan, Y. Y., Liu, M., Gong, H. T., Cheng, H. M., Dresselhaus, M. S., "Hydrogen Storage In Single-Walled Carbon Nanotubes At Room Temperature", Science, 286, pp 1127-1129 (1999)

[4] Kong, J., Chapline, M. G., Dai, H., "Functionalized Carbon Nanotubes For Molecular Hydrogen Sensors", Adv. Mater. 13, 1384-1386 (2001)

[5] Aldissi, M.; Schmitz, B.; Lazaro, E.; Bhamidipati, M.; Dixon, B., "Conducting Polymers In Ultracapacitor Applications", 56.sup.th Annu. Tech. Conf.—Soc. Plast. Eng., (Vol. 2), pp 1197-1201 (1998)

[6] An, K. H.; Kim, W. S.; Park, Y. S.; Moon, J.-M.; Bae, D. J.; Lim, S. C.; Lee, Y. S.; Lee, Y. H. "Electrochemical Properties Of High-Power Supercapacitors Using Single-Walled Carbon Nanotube Electrodes", Adv. Funct. Mater, 11, pp 387-392 (2001)

[7] Yu, R., Chen, L., Liu, Q., Lin, J., Tan, K.-L., Ng, S. C., Chan, H. S. O., Xu, G.-Q., Hor, T. S. A. "Platinum Deposition On Carbon Nanotubes Via Chemical Modification", Chem. Mater. 10, pp 718-722 (1998)

[8] Planeix, J. M.; Coustel, N.; Cog, B.; Brotons, V.; Kumbhar, P. S.; Dutartre, R.; Geneste, P.; Bernier, P.; Ajayan, P. M., "Application Of Carbon Nanotubes As Supports_in Heterogeneous Catalysis", J. Am. Chem. Soc. 116, pp 7935-7936 (1994)

[9] Tans, S. J., Verschueren, A. R. M., Dekker, C., "Room-Temperature Transistor Based On A Single Carbon Nanotube", Nature 393, pp 49-52 (1998)

[10] Bechtold, A.; Hadley, P.; Nakanishi, T.; Dekker, C., "Logic Circuits With Carbon Nanotube Transistors". Science 294 pp 1317-1320 (2001)

[11] Ljima, S. "Helical Microtubules of Graphitic Carbon." Nature, 354, 56-58 (1991)

[12] Ebbeson, T. W., Ajayan, P. M. "Large Scale Synthesis Of Carbon Nanotubes", Nature 358, pp 220-222 (1992)

[13] Saito et al., Chem. Phys. Lett, 1995, 236:419-426

[14] Thess, A.; Lee, R.; Nikolaev, P.; Dai, H.; Petit, P.; Robert, J.; Xu, C.; Lee, Y. H.; Kim, S. G.; Rinzler, A. G.; Colbert, D. T.; Scuseria, G. E.; Tomanek, D.; Fischer, J. E.; _Smalley, R. E., "Crystalline Ropes Of Metallic Carbon Nanotubes". Science 273, pp 483-487 (1996)

[15] Muradov et al., Int. J. Hydrogen Energy, 1993, 18:211-215

[16] Ishihara et al., Chem. Left., 1995, 2:93-94

[17] Oger, G., "French Firm Hopes To Get PR Bounce Out Of Nanotubes In Tennis Rackets", Small Times, Nov. 7, 2001, http://www.smalltimes.com/articles/article display.cfm?ARTICLE ID=2676__37&p=109)

[18] Novoselov et al., <<Electric field effect in atomically thin carbon films>>, Science, 306, 666-669 (2004)

[19] Novoselov et al., <<Two-dimensional gas of massless Dirac fermions in graphene>>, Nature, 438, 197-200 (2005)

[20] <<Synthesis of praphite intercalation compounds>>, A. Hérold in Chemical physics of intercalation, A. P. Legrand et S. Flandrois Eds, NATO ASI Series, series B, Vol. 172, pp. 3-45 (1987)

[21] C. Stein, J. Poulenard, L. Bonnetain, J. Golé, C. R. Acad. Sci, Paris 260, 4503 (1965)

[22] Novoselov et al., <<Electric field effect in atomically thin carbon films>>, Science 306, 666 (2004)

[23] Chakraborty et al., <<Functionalization of potassium graphite>>, Angew. Chem. Int. Ed., 46, 4486-4488 (2007)

[24] Niyogi, S.; Bekyarova, E.; Itkis, M. E.; McWilliams, J. L.; Hamon, M. A.; Haddon, R. C., "Solution Properties of Graphite and Graphene", J. Am. Chem, Soc., 128, 7720-7721 (2006)

[25] McAllister, M. J.; Li, J.-L.; Adamson, D. H.; Schniepp, H. C.; Abdala, A. A.; Liu, J.; Herrera-Alonso, M.; Milius, D. L.; Car, R.; Prud'homme, R. K.; Aksay, L A., "Single Sheet Functionalized Graphene by Oxidation and Thermal Expansion of Graphite", Chem. Mater., 2007; ASAP Article

[26] Matyjaszewski, K.; Eds.; Advances in Controlled/Living Radical Polymerization, (American Chemical Society 2003)

[27] Hsieh, H. L.; Quirk, R. P.; Eds.; Anionic Polymerization Principles and Practical Applications, (Marcel Dekker 1996)

[28] Matyjaszewski, K.; Davies, T. P; Eds.; Handbook of Radical Polymerization, (Wiley-Interscience 2002)

[29] Fontaine, L.; Initiation à la Chimie et à la Physico-Chimie Macromoléculaires (Groupe Français d'Etudes et d'Applications des Polyméres volume 12 (Chapitre 3))

[30] Matyjaszewski, K.; Eds.; Cationic Polymerizations Mechanisms, Synthesis, and Applications, (Marcel Dekker 1996)
[31] Stankovitch et al., <<Graphene based composite materials>>, Nature, 442, 282-286 (2006)
[32] Pénicaud et al., <<Spontaneous dissolution of a single-wall carbon nanotube salt>>, J. Am. Chem. Soc., 127, 8-9, (2005)
[33] WO 2005/073127
[34] FR 2 873 381
[35] Bernal, J. D., Proc. Roy. Soc., A, 106, 749, (1924)
[36] Freise, E. J. <<Structure of graphite>>, Nature (London) 193, 671-672, (1962)
[37] Viculis et al., <<A chemical route to carbon nanoscrolls>>, Science, 299, 1361 (2003)
[38] Dai, L.; Mau, A. W. H. "Controlled Synthesis Of Modification Of Carbon Nanotubes and C60: Carbon Nanostructures For Advanced Polymeric Composite Materials", Adv. Mater., 13, pp 899-913 (2001)
[39] Calvert, P. "A Recipe For Strength". Nature, 399, pp 210-211 (1999)
[40] Lake, M. L.; Ting, J.-M. "Vapor Grown Carbon Fiber Composites", Carbon Mater, Adv. Technol. pp 139-167 (1999)
[41] F. Béguin et R. Sefton New ternary lamellar compounds of graphite, Carbon 13, 293-)295 (1975)
[42] FR 04/05120
[43] WO 2006/136715
[44] Schedin et al., <<Detection of individual gas molecules adsorbed on graphene>>, publié le 29 juillet 2007 dans le journal Nature
[45] Hongjie Dai et al., Science, 319: 1229-1232 (2008)
[46] III, C. R., et al., Biophys. J. 64, 919-924 (1993)

The invention claimed is:

1. A method for solubilizing graphite, characterized in that it comprises the following steps, which are carried out under inert atmosphere:
   a) reduction of graphite by an alkali metal to lead to a graphite intercalation compound; and
   b) exposure of the graphite intercalation compound to a polar aprotic solvent to lead to a reduced graphene solution, wherein the polar aprotic solvent has a dielectric constant from 25 to 200.

2. A method according to claim 1, wherein the polar aprotic solvent has the following formula:

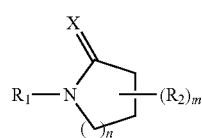

(I)

wherein n and m are independently 1 or 2;
X represents O or S;
$R_1$ represents a linear or branched $C_1$-$C_6$ alkyl or $C_2$-$C_6$ alkenyl group, or a $C_3$-$C_6$ cycloalkyl or $C_5$-$C_6$ cycloalkenyl group; and
$R_2$ represents H, a halogen atom, a linear or branched $C_1$-$C_6$ alkyl or $C_2$-$C_6$ alkenyl group, a $C_3$-$C_6$ cycloalkyl or $C_5$-$C_6$ cycloalkenyl group, or an —OR group wherein R represents a linear or branched $C_1$-$C_6$ alkyl or $C_2$-$C_6$ alkenyl group, a $C_3$-$C_6$ cycloalkyl or $C_5$-$C_6$ cycloalkenyl group.

3. A method according to claim 1 or 2, wherein the graphite intercalation compound is in the form of a binary compound having the formula $KC_8$.

4. A method according to claim 1 or 2, wherein the graphite intercalation compound is in the form of a ternary compound having the structure $M(Solv)_yC_x$, wherein M is an alkali metal ion, Solv is an aprotic solvent molecule, x represents an integer between 6 and 200 and y represents an integer between 0 and 4.

5. A method according to claim 4, wherein the aprotic solvent is an aromatic or a nucleophilic solvent.

6. A method according to claim 5, wherein the aromatic solvent is benzene or toluene.

7. A method according to claim 5, wherein the nucleophilic solvent is THF.

8. A method according to claim 1, wherein the step of reduction a) is carried out in the presence of a nucleophilic solvent.

9. A method according to claim 8, wherein the nucleophilic solvent is an aprotic solvent whose structure contains at least one oxygen atom.

10. A method according to claim 4, wherein the alkali metal is potassium, the solvent is THF and the graphite intercalation compound is a ternary compound having the structure $K(THF)_yC_x$, wherein x represents an integer between 6 and 200, and y represents an integer between 0 and 4.

11. A method according to claim 1, wherein the reduction step a) is selected from the group comprising vapor-phase reduction by an alkali metal followed by exposure to an aprotic solvent whose structure contains at least one oxygen atom, electro-chemical reduction, and reduction by a polyaryl alkali salt in an aprotic solvent.

12. A method according to claim 1, wherein the reduction step a) comprises the addition of a polyaryl alkali salt of formula $A^+B^-$ to graphite under inert atmosphere, wherein:
   $A^+$ represents a cation of an alkali ion, and
   $B^-$ represents an anion of a polyaromatic compound.

13. A method according to claim 12, wherein the polyaromatic compound is selected from the group comprising naphthalene, benzophenone, fluorenone, benzoquinone and anthraquinone.

14. A method according to claim 13, wherein the polar aprotic solvent is N-methylpyrrolidone.

15. A method according to claim 1, wherein the mixing step b) is carried out at a temperature from −22 to 202° C.

16. A method according to claim 15, wherein the step of mixing b) is carried out at a temperature from 20° to 25° C.

17. A method according to claim 1, wherein the mixing step b) is carried out under mechanical or magnetic stirring or by sonication, or without stirring.

18. A method according to claim 1, further including a step of centrifugation.

19. A reduced graphene solution obtained by a method according to claim 1.

20. A method according to claim 1, further comprising a step of evaporation of the polar aprotic solvent.

21. A method comprising preparing composite materials from the reduced graphene solution according to claim 19.

22. A method according to claim 21, wherein the composite material is obtained by mixing a graphene solution and a polymer solution or a polymer mixture solution.

23. A method according to claim 21, wherein the composite material is obtained by in situ polymerization of a monomer or mixture or monomers in a graphene solution.

24. A method according to claim 21, wherein the composite material is obtained by polymerization-grafting of a monomer on one or more graphene plane(s).

25. A method according to any one of claims 21 to 24, wherein graphene is functionalized by one or more graft(s) of functional groups.

26. A method comprising preparing electronic or micro-electronic components from the reduced graphene solution according to claim 19.

27. A method according to claim 26, wherein the electronic or micro-electronic component is a capacitor or a transistor.

28. A method comprising depositing a reduced graphene solution according to claim 19, on a substrate.

29. A method according to claim 28, wherein the deposit is carried out by simple deposition, by application, by dip-coating or by spin coating of the reduced graphene solution.

* * * * *